(12) United States Patent
Feng et al.

(10) Patent No.: US 11,584,692 B2
(45) Date of Patent: Feb. 21, 2023

(54) ZIRCONIA/TITANIUM OXIDE/CERIUM OXIDE DOPED RARE EARTH TANTALUM/NIOBATE RETA/NBO4 CERAMIC POWDER AND PREPARATION METHOD THEREOF

(71) Applicant: KUNMING UNIVERSITY OF SCIENCE AND TECHNOLOGY, Yunnan (CN)

(72) Inventors: Jing Feng, Yunnan (CN); Peng Wu, Yunnan (CN); Zhenhua Ge, Yunnan (CN); Peng Song, Yunnan (CN); Lin Chen, Yunnan (CN); Jun Wang, Yunnan (CN)

(73) Assignee: KUNMING UNIVERSITY OF SCIENCE AND TECHNOLOGY, Yunnan (CN)

( * ) Notice: Subject to any disclaimer, the term of this patent is extended or adjusted under 35 U.S.C. 154(b) by 0 days.

(21) Appl. No.: 17/418,207

(22) PCT Filed: Jan. 8, 2019

(86) PCT No.: PCT/CN2019/070804
§ 371 (c)(1),
(2) Date: Jun. 24, 2021

(87) PCT Pub. No.: WO2020/133575
PCT Pub. Date: Jul. 2, 2020

(65) Prior Publication Data
US 2022/0112132 A1    Apr. 14, 2022

(30) Foreign Application Priority Data
Dec. 29, 2018 (CN) .......................... 201811647659.0

(51) Int. Cl.
C04B 35/495   (2006.01)
C04B 35/626   (2006.01)
C04B 35/64    (2006.01)

(52) U.S. Cl.
CPC ........ *C04B 35/495* (2013.01); *C04B 35/6261* (2013.01); *C04B 35/62625* (2013.01);
(Continued)

(58) Field of Classification Search
CPC .............. C04B 35/495; C04B 35/6261; C04B 35/62625; C04B 2235/3229;
(Continued)

(56) References Cited

U.S. PATENT DOCUMENTS

| 5,667,723 A | 9/1997 | Huguenin |
| 2009/0202735 A1 | 8/2009 | Marlin et al. |

FOREIGN PATENT DOCUMENTS

| CN | 102180671 A | 9/2011 |
| CN | 103420674 A | 12/2013 |

(Continued)

OTHER PUBLICATIONS

Wang et al. Phase stability and thermo-physical properties of ZrO2—CeO2—TiO2 ceramics for thermal barrier coatings. Journal of the European Ceramic Society 38 (2018) 2841-2850.*
(Continued)

*Primary Examiner* — Noah S Wiese
(74) *Attorney, Agent, or Firm* — Global IP Services; Tianhua Gu

(57) ABSTRACT

The present disclosure relates to the technical field of ceramic powder preparation, and discloses a zirconia/titania/cerium oxide doped rare earth tantalum/niobate RETa/NbO$_4$ ceramic powder and a preparation method thereof. A general chemical formula of the ceramic powder is $RE_{1-x}(Ta/Nb)_{1-x}(Zr/Ce/Ti)_{2x}O_4$, $0<x<1$, the crystal structure of the ceramic
(Continued)

powder is orthorhombic, the lattice space group of the ceramic powder is $C222_1$, the particle size of the ceramic powder ranges from 10 to 70 µm, and particles of the ceramic powder are spherical. During preparation, the raw materials are ball-milled before a high temperature solid phase reaction, then mixed with a solvent and an organic binder to obtain a slurry C, then centrifuged and atomized to obtain dry pellets, and finally sintered to obtain a zirconia/titanium oxide/cerium oxide doped rare earth tantalum/niobate $RETa/NbO_4$ ceramic powder, which satisfies the requirements of APS technology for ceramic powders.

10 Claims, 1 Drawing Sheet

(52) U.S. Cl.
CPC ...... *C04B 35/64* (2013.01); *C04B 2235/3229* (2013.01); *C04B 2235/3232* (2013.01); *C04B 2235/3244* (2013.01); *C04B 2235/3251* (2013.01); *C04B 2235/528* (2013.01); *C04B 2235/5436* (2013.01); *C04B 2235/6567* (2013.01); *C04B 2235/76* (2013.01)

(58) Field of Classification Search
CPC .... C04B 2235/3232; C04B 2235/3244; C04B 2235/3251; C04B 2235/5436; C04B 2235/76
See application file for complete search history.

(56) References Cited

FOREIGN PATENT DOCUMENTS

| CN | 105152649 A | | 12/2015 | |
|---|---|---|---|---|
| CN | 105777118 A | * | 7/2016 | ........... C04B 35/495 |
| CN | 105777118 A | | 7/2016 | |
| CN | 106167406 A | | 11/2016 | |
| CN | 106187185 A | | 12/2016 | |
| CN | 106884132 A | * | 6/2017 | ............... C23C 4/10 |
| CN | 108911747 A | | 11/2018 | |

OTHER PUBLICATIONS

Junjie He et al. New class of high-entropy defect fluorite oxides RE2(Ce0.2Zr0.2Hf0.2Sn0.2TiO.2)2O7 (RE=Y, Ho, Er, or Yb) as promising thermal barrier coatings. Journal of the European Ceramic Society vol. 41, Issue 12, Sep. 2021, pp. 6080-6086.*

* cited by examiner

ZIRCONIA/TITANIUM OXIDE/CERIUM OXIDE DOPED RARE EARTH TANTALUM/NIOBATE RETA/NBO4 CERAMIC POWDER AND PREPARATION METHOD THEREOF

CROSS REFERENCE TO RELATED PATENT APPLICATION

The present application is the US national stage of PCT/CN2019/070804 filed on Jan. 8, 2019, which claims the priority of the Chinese patent applications No. 201811647659.0 filed on Dec. 29, 2018, which application is incorporated herein by reference.

FIELD OF TECHNOLOGY

The present disclosure relates to the field of ceramic powder preparation, in particular, to a zirconia/titania/cerium oxide doped rare earth tantalate/niobate RETa/NbO$_4$ ceramic powder and a preparation method thereof.

BACKGROUND

Thermal barrier coating materials are mainly used in the aviation engine industry, and have the advantages of low thermal conductivity, high thermal expansion coefficient, anti-sintering, and good high-temperature stability. The thermal barrier coating materials are heat-insulating, anti-oxidation, and can effectively resist particle impact, thereby serving as a substrate that protects components in high-temperature areas of aero-engines.

Yttria Stabilized Zirconia (YSZ) is currently the most widely studied and used thermal barrier coating material, but the phase changes of YSZ when the temperature is above 1200° C. will cause the coating to fail, which prompts researchers to look for thermal barrier coating materials that can replace YSZ. In 2007, Professor Clarke's research group at Harvard University and Professor Levi from the University of California, Santa Barbara proposed that YTaO$_4$ ferroites can be expected to be used as new thermal barrier coating materials. The research mainly focuses on the theoretical calculation of the crystal structure and luminescence performance of YTaO$_4$ ferroites. In 2016, Wang et al. prepared a dense rare earth tantalate bulk material through a solid-phase reaction method, and concluded that the thermal conductivity of the dense rare earth tantalate bulk material is much lower than that of YSZ. In addition, studies have shown that the 114-phase RETa/NbO$_4$ compound doped with heterotetravalent ions can further reduce the thermal conductivity of the substrate material and increase the thermal expansion coefficient of the substrate material. A number of research and experimental conclusions by the researchers provide a theoretical basis for the application of rare earth tantalates in thermal barrier coatings.

Atmospheric plasma spraying (APS) and electron beam physical vapor deposition (EBPVD) technologies are currently used in the industry to prepare thermal barrier coating materials. EBPVD is mostly used to prepare thermal barrier coatings with a columnar crystal structure. APS technology is mostly used to prepare thermal barrier coatings with a laminar structure, and the coating is compact and the porosity is small. However, APS technology has many requirements for powders it uses, for example the powders need to have a certain density, an appropriate amount of organic binders, a certain particle shape, and a certain particle size distribution, etc. Particularly the particle size usually ranges from 10 to 200 μm, the shape of the powder particles should be spherical or nearly spherical. At present, no process can prepare doped rare earth tantalate ceramic powder that meets the above requirements.

SUMMARY

The present disclosure provides a zirconia/titanium oxide/cerium oxide doped rare earth tantalate/niobate RETa/NbO$_4$ ceramic powder and a preparation method thereof, to meet the requirements of APS technology for ceramic powders. After spraying the zirconia/titanium oxide/cerium oxide doped rare earth tantalate/niobate RETa/NbO$_4$ ceramic powder on an alloy substrate, heat conduction can be reduced.

The present disclosure provides a zirconia/titanium oxide/cerium oxide doped rare earth tantalate/niobate RETa/NbO$_4$ ceramic powder. A general chemical formula of the ceramic powder is $RE_{1-x}(Ta/Nb)_{1-x}(Zr/Ce/Ti)_{2x}O_4$, $0<x<1$, the crystal structure of the ceramic powder is orthorhombic, the lattice space group of the ceramic powder is $C222_1$, the particle size (aka the mean particle size) of the ceramic powder ranges from 10 to 70 μm, and particles of the ceramic powder are spherical.

The above technical solution has the following beneficial effects:

1. In this basic technical solution, the particle size of the zirconia/titanium oxide/cerium oxide doped rare earth tantalate/niobate RETa/NbO$_4$ ceramic powder ranges from 10 to 70 μm. On the one hand, such a particle size distribution satisfies the requirements of APS technology for powders, and the nozzle of the spray gun will not be blocked due to the powder particle size being too large, thereby avoiding spraying failure. On the other hand, if the particle size of the powder is too small, the powder quality will be too low, which causes the powder to gather on the outer surface of the plasma line of the spray gun instead of entering its core, in which case the powder will be heated for a long time and directly volatilized, resulting in spraying failure. This will not happen in the present disclosure, because the particle size of the ceramic powder in the present disclosure ranges from 10 to 70 μm.

2. In this basic technical solution, the particles of the zirconia/titanium oxide/cerium oxide doped rare earth tantalate/niobate RETa/NbO$_4$ ceramic powder are spherical, so the surface of the powder is smooth, which makes the powder's fluidity better. The powder not only meets the requirements of APS technology, but is also able to obtain high-quality zirconia/titania oxide/cerium oxide doped rare earth tantalate/niobate coatings.

3. In this basic technical solution, doping tetravalent ions ($Zr^{4+}$ or $Ce^{4+}$ or $Ti^{4+}$) in the RETa/NbO$_4$ compound can further reduce the thermal conductivity of the substrate and increase the thermal expansion coefficient of the substrate.

Further, RE represents one or more of Sc, Y, La, Nd, Sm, Eu, Gd, Dy, Er, Yb, and Lu.

Beneficial effects: The inventors have verified through experiments that by using one or more of these rare earth elements, the obtained rare earth tantalate/niobate RETa/NbO$_4$ ceramic powder has a uniform particle size.

The present disclosure further provides a method for preparing the zirconia/titanium oxide/cerium oxide doped rare earth tantalate/niobate RETa/NbO$_4$ ceramic powder, including:

operation (1):

weighing a $RE_2O_3$ powder, a $Ta_2O_5$ powder/$Nb_2O_5$ powder, and a dopant ($ZrO_2$ powder/$CeO_2$ powder/$TiO_2$ powder) with the molar ratio RE:(Ta/Nb):(Zr/Ce/Ti) equal to (1-x):

(1-x):2x, adding the powders to a solvent to form a mixed solution, ball milling the mixed solution with a ball mill, and drying the mixed solution to obtain a dry powder A, with the ball milling time not less than 10 h, and the ball milling speed not less than 300 r/min;

operation (2):

performing a high-temperature solid-phase reaction with the powder A obtained in operation (1) to obtain a powder B with a composition of $RE_{1-x}(Ta/Nb)_{1-x}(Zr/Ce/Ti)_{2x}O_4$, wherein a reaction temperature ranges from 1500 to 1800° C., and a reaction time ranges from 6 to 20 h;

operation (3):

mixing the powder B obtained in operation (2) with a solvent and an organic binder to obtain a slurry C, and drying the slurry C by centrifuging and atomizing the slurry C at a temperature of 400-800° C. to obtain dry pellets D, with the mass percentage of the powder B in the slurry C ranging from 10% to 40%, the mass percentage of the organic binder in the slurry C ranging from 0.1% to 3%, the rest of the slurry C being solvent, and the centrifugal speed ranging from 8000 to 9000 r/min; and operation (4):

sintering the pellets D obtained in operation (3) at a temperature of 800-1300° C. to obtain zirconia/titanium oxide/cerium oxide doped rare earth tantalate/niobate RETa/NbO$_4$ ceramic powder, with the sintering time ranging from 7 to 9 h.

This technical solution has the following beneficial effects:

1. The zirconia/titanium oxide/cerium oxide doped rare earth tantalate/niobate RETa/NbO$_4$ ceramic powder with a particle size of 10-70 μm is prepared by the process of operation (1) to operation (4), to meet the requirements of APS technology. In the meanwhile, the rare earth tantalate/niobate $RE_3TaO_4$/$RE_3NbO_4$ ceramic powder is used as a thermal barrier coating.

2. A ceramic powder of $RE_{1-x}(Ta/Nb)_{1-x}(Zr/Ce/Ti)_{2x}O_4$ is obtained using operation (1) and operation (2).

3. The prepared slurry C is dried by centrifuging and atomizing in operation (3). The organic binder is used to agglomerate the fine powder particles in the ceramic powder of $RE_{1-x}(Ta/Nb)_{1-x}(Zr/Ce/Ti)_{2x}O_4$ together. The principle of drying by centrifuging and atomizing is: the slurry C enters a high-speed rotating spray plate and is sprayed into atomized droplets, which greatly increases the surface area of the slurry C. Because the atomized droplets are in contact with hot air, and water evaporates quickly, the slurry C can be dried in a very short time to obtain a powder with nearly spherical particles.

4. The sintering in operation (4) is to provide the pellets D obtained in operation (3) a certain bonding strength and a certain density, and thus a spherical shape.

Further, the drying in operation (1) is performed by a rotary evaporator, the drying temperature ranges from 40 to 60° C., and the rotary evaporation time ranges from 2 to 4 h.

Beneficial effects: adopting the rotary evaporator for drying reduces the drying time, and the powder can be dried sufficiently during the rotation process.

Further, the powder A obtained in operation (1), the powder B obtained in operation (2), and the rare earth tantalate/niobate RETa/NbO$_4$ ceramic powder obtained in operation (4) are all sieved with a 200-500 mesh sieve.

Beneficial effects: the powder obtained in each operation is sieved to avoid powder having large particles. Taking the sintering operation as an example, lumps generated during the sintering process can be removed by sieving.

Further, in operation (3), the temperature for centrifuging and atomizing the slurry C is 600° C., and the centrifugal speed is 8500 r/min.

Beneficial effects: The inventors have verified through experiments that the particle size of the powder obtained under these parameters is uniform, and all particles of the powder have a spherical shape.

Further, the $RE_2O_3$ powder and the $Ta_2O_5$ powder/$Nb_2O_5$ powder in operation (1) are pre-dried before weighing, the pre-drying temperature ranges from 400 to 700° C., and the drying time ranges from 5 to 8 h.

Beneficial effects: pre-drying can reduce the water content in the precursor powder, thereby reducing the influence of water on accurate weighing.

Further, the purity of the $RE_2O_3$ powder and the $Ta_2O_5$ powder/$Nb_2O_5$ powder in operation (1) is not lower than 99.9%.

Beneficial effects: high-purity precursor powders are adopted, which reduces the introduction of impurity elements and reduces the adverse effects of impurities on powder preparation.

Further, in operation (3), the mass percentage of the powder B in the slurry C is 25%, and the mass percentage of the organic binder in the slurry C is 2%.

Beneficial effects: The inventors have verified through experiments that under these parameters, the agglomeration of fine powder particles in the RETa/NbO$_4$ powder can be achieved.

Further, in operation (4), the sintering temperature is 1200° C., and the sintering time is 8 h.

Beneficial effects: The inventors have verified through experiments that the pellets D under these parameters have high bonding strength and high density, and have a spherical shape.

DETAILED DESCRIPTION

Figure 1:
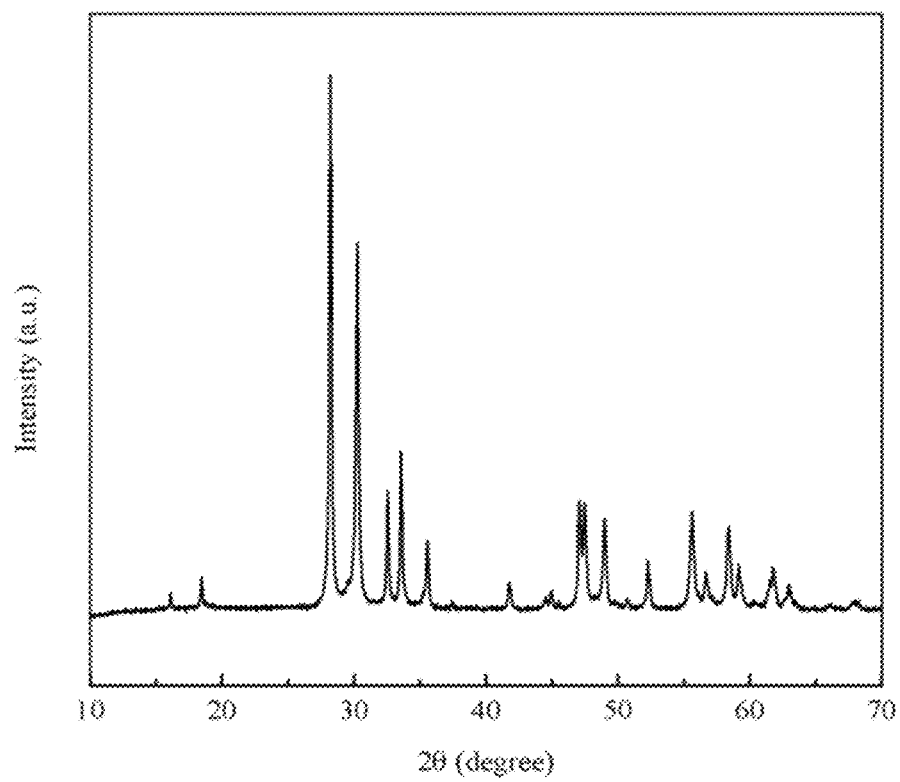
FIG. 1 shows an XRD diagram of zirconia doped rare earth tantalate ($Sc_{0.8}Ta_{0.8}Zr_{0.4}O_4$) prepared in Example 5 according to the present disclosure.

Some embodiments of the present disclosure will be described in further detail below.

The present disclosure provides a zirconia/titanium oxide/cerium oxide doped rare earth tantalate/niobate RETa/NbO$_4$ ceramic powder. A general chemical formula of the ceramic powder is $RE_{1-x}(Ta/Nb)_{1-x}(Zr/Ce/Ti)_{2x}O_4$, 0<x<1, with RE representing one or more of Sc, Y, La, Nd, Sm, Eu, Gd, Dy, Er, Yb, and Lu. The crystal structure of the ceramic powder is orthorhombic, the lattice space group of the ceramic powder is C222$_1$, the particle size of the ceramic powder ranges from 10 to 70 μm, and particles of the ceramic powder are spherical.

The applicant has conducted a large number of experiments on the zirconia/titanium oxide/cerium oxide doped rare earth tantalate/niobate RETa/NbO$_4$ ceramic powder and the preparation method thereof of the present disclosure during the research process, and now 12 sets of experiments are used for illustration. Parameters of the zirconia/titanium oxide/cerium oxide doped rare earth tantalate/niobate RETa/NbO$_4$ ceramic powder and the preparation method thereof in Examples 1-12 are shown in Table 1 and Table 2. Table 1 shows the specific parameters of Examples 1-6, and Table 2 shows the specific parameters of Examples 7-12.

TABLE 1

| | | Example | | | | | |
|---|---|---|---|---|---|---|---|
| | | 1 | 2 | 3 | 4 | 5 | 6 |
| x | | 0.2 | 0.2 | 0.2 | 0.4 | 0.4 | 0.4 |
| Dopant (g) | $ZrO_2$ | 5.58 | | | 8.92 | | |
| | $CeO_2$ | | 5.84 | | | 20.77 | |
| | $TiO_2$ | | | 2.71 | | | 7.23 |
| Rare earth oxide (g) | $Sc_2O_3$ | 6.24 | | | | | |
| | $Y_2O_3$ | | 10.59 | | | | |
| | $La_2O_3$ | | | 11.50 | | | 11.50 |
| | $Nd_2O_3$ | | | | 9.63 | | |
| | $Sm_2O_3$ | | | | | 15.79 | |
| | $Eu_2O_3$ | | | 11.50 | | | 11.50 |
| | $Gd_2O_3$ | | | | | | |
| | $Dy_2O_3$ | | | | 9.63 | | |
| | $Er_2O_3$ | | | | | | |
| | $Yb_2O_3$ | | | | | | |
| | $Lu_2O_3$ | | 10.59 | | | | |
| $Ta_2O_5$ (g) | | 20 | 12 | 12 | 10 | 14 | 10 |
| $Nb_2O_5$ (g) | | | | | | | |
| Pre-drying | Temperature | 600 | 500 | 400 | 650 | 550 | 700 |
| | Time (h) | 8 | 6 | 7 | 7 | 6 | 8 |
| Ball milling | Time (h) | 10 | 10 | 10 | 10 | 11 | 11 |
| | Speed (r/min) | 300 | 350 | 380 | 350 | 400 | 300 |
| Rotary evaporation | Temperature | 60 | 40 | 50 | 50 | 40 | 60 |
| | Time (h) | 2 | 2 | 3 | 4 | 3 | 3 |
| Sieving | Mesh | 300 | 200 | 200 | 300 | 300 | 300 |
| High-temperature solid-phase reaction | Reaction temperature (° C.) | 1700 | 1500 | 1600 | 1550 | 1650 | 1750 |
| | Reaction time (h) | 10 | 6 | 15 | 18 | 20 | 20 |
| Slurry C (mass percent) | Powder B | 10% | 10% | 20% | 20% | 20% | 20% |
| | Organic adhesive — Polyvinyl alcohol | 0.1% | 0.1% | 1% | | | |
| | Gum arabic | | | | 1.5% | 1.5% | 1.5% |
| | Solvent — Deionized water | | | | 78.5% | 78.5% | 78.5% |
| | Ethanol | 89.9 | 89.9 | 79% | | | |
| Drying by centrifuging and atomizing | Temperature | 600 | 400 | 500 | 550 | 650 | 700 |
| | speed (r/min) | 8500 | 8000 | 9000 | 8500 | 8000 | 9000 |
| Sintering | Temperature | 1200 | 800 | 900 | 1000 | 1100 | 1150 |
| | Time (h) | 8 | 7 | 8 | 9 | 7 | 9 |

TABLE 2

| | | Example | | | | | |
|---|---|---|---|---|---|---|---|
| | | 7 | 8 | 9 | 10 | 11 | 12 |
| x | | 0.6 | 0.6 | 0.6 | 0.8 | 0.8 | 0.8 |
| Dopant (g) | $ZrO_2$ | 16.69 | | | 25.96 | | |
| | $CeO_2$ | | 38.85 | | | 20.72 | |
| | $TiO_2$ | | | 9.01 | | | 14.42 |
| Rare earth oxide (g) | $Sc_2O_3$ | | | | | | |
| | $Y_2O_3$ | | | | | 5.05 | |
| | $La_2O_3$ | | | | | | |
| | $Nd_2O_3$ | | | | 9.62 | | |
| | $Sm_2O_3$ | | | | | | |
| | $Eu_2O_3$ | | | | | | |
| | $Gd_2O_3$ | 8.58 | | | | | |
| | $Dy_2O_3$ | | 14.03 | | | | 8.66 |
| | $Er_2O_3$ | | | 7.34 | | 5.05 | |
| | $Yb_2O_3$ | | | | 9.62 | | 8.66 |
| | $Lu_2O_3$ | 8.58 | | 7.34 | | 5.05 | |
| $Ta_2O_5$ (g) | | | | | | | |
| $Nb_2O_5$ (g) | | 3.5 | 4 | 3 | 1.5 | 1 | 1.1 |
| Pre-drying | Temperature | 450 | 500 | 600 | 700 | 500 | 550 |
| | Time (h) | 8 | 6 | 6 | 8 | 8 | 8 |
| Ball milling | Time (h) | 11 | 11 | 12 | 12 | 12 | 12 |
| | Speed (r/min) | 350 | 300 | 400 | 450 | 400 | 350 |
| Rotary evaporation | Temperature | 50 | 40 | 60 | 50 | 40 | 60 |
| | Time (h) | 3 | 4 | 2 | 4 | 2 | 4 |
| Sieving | Mesh | 400 | 400 | 400 | 500 | 500 | 500 |

TABLE 2-continued

|  |  | Example | | | | | |
|---|---|---|---|---|---|---|---|
|  |  | 7 | 8 | 9 | 10 | 11 | 12 |
| High-temperature solid-phase reaction | Reaction temperature(° C.) | 1800 | 1750 | 1600 | 1650 | 1700 | 1800 |
|  | Reaction time (h) | 6 | 15 | 6 | 15 | 20 | 10 |
| Slurry C (mass percent) | Powder B | 30% | 30% | 30% | 40% | 40% | 40% |
|  | Organic adhesive — Polyvinyl alcohol | 2% | 2% | 2.5% |  |  |  |
|  | Gum arabic |  |  |  | 2.5% | 3% | 3% |
|  | Solvent — Deionized water |  |  |  | 57.5% | 57% | 57% |
|  | Ethanol | 68% | 68% | 67.5% |  |  |  |
| Drying by centrifuging and atomizing | Temperature | 750 | 700 | 800 | 600 | 500 | 800 |
|  | Speed (r/min) | 8500 | 8000 | 8000 | 8500 | 8000 | 9000 |
| Sintering | Temperature | 1200 | 1050 | 1000 | 1100 | 900 | 1300 |
|  | Time (h) | 9 | 8 | 8 | 7 | 8 | 9 |

Taking Example 1 as an example, the method for preparing the zirconia/titanium oxide/cerium oxide doped rare earth tantalate/niobate RETa/NbO$_4$ ceramic powder of the present disclosure is described below.

The method for preparing the zirconia (ZrO$_2$) doped rare earth tantalate (RETaO$_4$) ceramic powder (Sc$_{0.8}$Ta$_{0.8}$Zr$_{0.4}$O$_4$) includes the following operations:

Operation (1):

The zirconia (ZrO$_2$) powder, the rare earth oxide powder Sc$_2$O$_3$, and the tantalate pentoxide (Ta$_2$O$_5$) powder were pre-dried. The pre-drying temperature was 600° C. and the pre-drying time was 8 hours. 5.58 g of zirconium oxide (ZrO$_2$) powder, 6.24 g of rare earth oxide powder Sc$_2$O$_3$, and 20 g of tantalate oxide (Ta$_2$O$_5$) powder were weighed and added into the ethanol solvent to obtain a mixed solution, such that the molar ratio Sc:Ta:Zr in the mixed solution was 2:2:1. The mixed solution was ball milled with a ball mill for 10 hours, and the speed of the ball mill was 300 r/min.

The slurry obtained after ball milling was dried using a rotary evaporator (model: N-1200B), the drying temperature was 60° C., and the drying time was 2 hours. The dried powder was sieved through a 300-mesh sieve to obtain powder A.

Operation (2):

A high-temperature solid-phase reaction was performed on the powder A obtained in operation (1) to prepare powder B with a composition of ZrO$_2$ doped with ScTaO$_4$, the reaction temperature was 1700° C., and the reaction time was 10 h. A 300-mesh sieve was adopted to sieve the powder B.

Operation (3):

The powder B sieved in operation (2) was mixed with a deionized water solvent and an organic binder to obtain slurry C, where the mass percentage of powder B in slurry C was 25%, and the mass percentage of the organic binder in the slurry C was 2%, the rest of the slurry C was solvent. The organic adhesive may be polyvinyl alcohol or gum arabic, and in this embodiment, polyvinyl alcohol was adopted. Then, the slurry C was dried by centrifuging and atomizing, the temperature during drying was 600° C., the centrifugal speed was 8500 r/min, and dried pellets D were obtained.

Operation (4):

The pellets D obtained in operation (3) were sintered at a temperature of 1200° C. for 8 hours, and then the sintered pellets D were sieved with a 300-mesh sieve to obtain zirconia (ZrO$_2$) with a particle size of 10 to 70 nm and a doped ScTaO$_4$ ceramic powder (Sc$_{0.8}$Ta$_{0.8}$Zr$_{0.4}$O$_4$) comprising spherical particles.

Examples 2-6 only differ from Example 1 in the parameters and the final products.

XRD characterization and SEM characterization were performed in Examples 1-12. Taking Example 1 as an example, the characterization of the obtained zirconia doped rare earth tantalate ceramic powder (Sc$_{0.8}$Ta$_{0.8}$Zr$_{0.4}$O$_4$) is described:

1 XRD characterization:

The X-ray diffraction pattern is shown in FIG. 1. It can be seen from FIG. that the zirconia doped rare earth tantalate ceramic powder (Sc$_{0.8}$Ta$_{0.8}$Zr$_{0.4}$O$_4$) obtained in Example 1 is orthorhombic with no impurity phase, and the lattice space group of the ceramic powder is C222$_1$. The zirconia/titanium oxide/cerium oxide doped rare earth tantalate/niobate RETa/NbO$_4$ ceramic powders obtained in Examples 2-12 are also orthorhombic with no impurity phases, and the lattice space group of the ceramic powders is C222$_1$.

Figure 2:
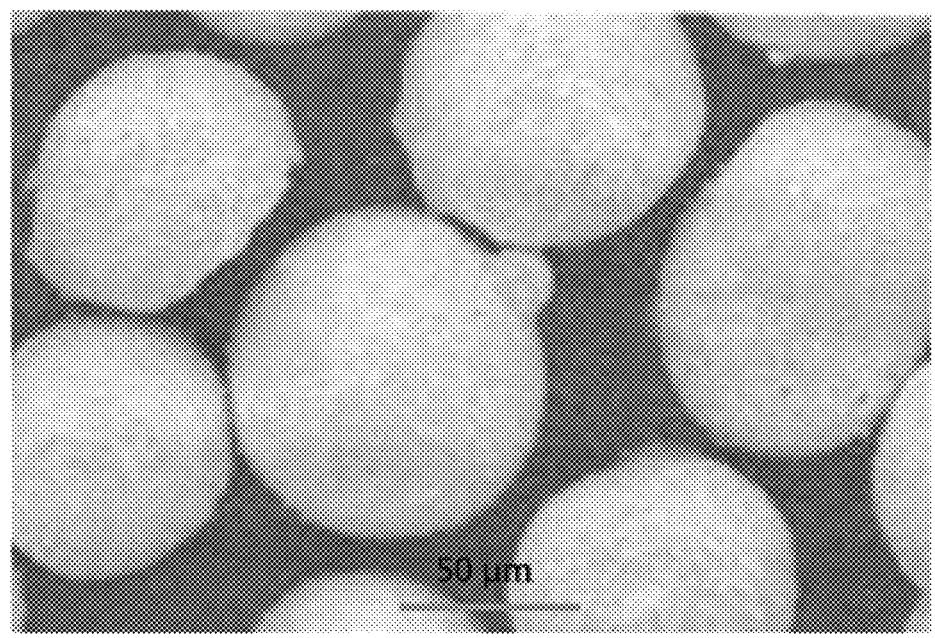
FIG. 2 shows an SEM diagram of zirconia doped rare earth tantalate ($Sc_{0.8}Ta_{0.8}Zr_{0.4}O_4$) prepared in Example 5 according to the present disclosure.

SEM characterization:

The SEM spectrum of the zirconia doped rare earth tantalate ceramic powder (Sc$_{0.8}$Ta$_{0.8}$Zr$_{0.4}$O$_4$) prepared in Example 1 is shown in FIG. 2. It can be seen from FIG. 2 that the particle sizes of the powder range from 10 to 70 μm, and the particles are spherical. The particle sizes of the zirconia/titanium oxide/cerium oxide doped rare earth tantalate/niobate RETa/NbO$_4$ ceramic powders obtained in Examples 2-12 range from 10 to 70 μm, and the particles are spherical.

Three groups of comparative examples are listed and compared with the ceramic powders obtained in Examples 1-12:

Comparative Example 1: different from Example 1 in that the drying here is not performed by centrifuging and atomizing, the drying temperature is 800° C., the drying time is 1.5 h, the final powder has a particle size of 180 μm-220 μm, and the particles have an irregular shape.

Comparative Example 2: different from Example 1 in that the ball milling time here is 7 hours, and the average particle size of the finally obtained powder is greater than 200 μm.

Comparative Example 3: different from Example 1 in that after sintering, the sieving process is not performed, and the finally obtained powder contains lumps with a particle size greater than 220 μm.

In summary, the zirconia/titanium oxide/cerium oxide doped rare earth tantalate/niobate RETa/NbO$_4$ ceramic powders prepared in examples 1-12 have a particle size of 10-70 μm and the particles are spherical, which conforms to the requirements of APS technology for powders, and ceramic powders that meet the requirements of APS technology are not obtained in Comparative Examples 1-3.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

For those skilled in the art, several modifications and improvements can be made without departing from the principle of the technical solution of the present disclosure. These should also be regarded as the protection scope of the present disclosure, and these will not affect the effect of the implementation and unity of the present disclosure.

What is claimed is:

1. A ceramic powder comprising:
   a rare earth tantalate (RETaO$_4$) or a rare earth niobate (RENbO$_4$) doped with a dopant selected from one of zirconia, titanium oxide and cerium oxide;
   wherein, a general chemical formula of the ceramic powder is RE$_{1-x}$(Ta or Nb)$_{1-x}$(Zr or Ce or Ti)$_{2x}$O$_4$, wherein 0<x<1;
   the ceramic powder has an orthorhombic crystal structure, a lattice space group of C222$_1$, and a particle size of from 10 to 70 and particles of the ceramic powder are spherical.

2. The ceramic powder according to claim 1, wherein RE represents one or more selected from Sc, Y, La, Nd, Sm, Eu, Gd, Dy, Er, Yb, and Lu.

3. A method for preparing the ceramic powder according to claim 1 comprising:
   operation (1):
   weighing a RE$_2$O$_3$ powder, a Ta$_2$O$_5$ powder or a Nb$_2$O$_5$ powder, and a dopant selected from one of ZrO$_2$ powder, CeO$_2$ powder and TiO$_2$ powder with the molar ratio of RE:(Ta or Nb):(Zr or Ce or Ti) equal to (1-x):(1-x):2x, and adding the powders to a solvent to form a mixed solution, ball milling the mixed solution with a ball mill, and drying the mixed solution to obtain a dry powder A, with a ball milling time of 10 hours or more, and a ball milling speed of 300 rpm or more;
   operation (2):
   performing a high-temperature solid-phase reaction with the powder A obtained in operation (1) to obtain a powder B with a composition of RE$_{1-x}$(Ta or Nb)$_{1-x}$(Zr or Ce or Ti)$_{2x}$O$_4$, with a reaction temperature of from 1500 to 1800° C., and a reaction time of from 6 to 20 hours;
   operation (3):
   mixing the powder B obtained in operation (2) with a solvent and an organic binder to obtain a slurry C, and drying the slurry C by centrifuging and atomizing the slurry C at a temperature of 400-800° C. to obtain dry pellets D, wherein the mass percentage of the powder B in the slurry C ranges from 10% to 40%, the mass percentage of the organic binder in the slurry C ranges from 0.1% to 3%, the rest of the slurry C is solvent, and the speed of the centrifuging ranges from 8000 to 9000 rpm; and
   operation (4):
   sintering the pellets D obtained in operation (3) at a temperature of 800-1300° C. with a sintering time of from 7 to 9 h to obtain the ceramic powder.

4. The method according to claim 3, wherein adopting a rotary evaporator for the drying in operation (1), with a drying temperature of from 40 to 60° C., and a rotary evaporation time of from 2 to 4 hours.

5. The method according to claim 4, wherein the powder A obtained in the operation (1), the powder B obtained in operation (2), and the ceramic powder obtained in operation (4) are all sieved with a 200-500 mesh sieve.

6. The method according to claim 5, wherein in operation (3), the temperature for centrifuging and atomizing the slurry C is 600° C., and the speed of the centrifuging is 8500 rpm.

7. The method according to claim 6, wherein the RE$_2$O$_3$ powder, the Ta$_2$O$_5$ powder and the Nb$_2$O$_5$ powder in operation (1) are pre-dried before weighing, with a pre-drying temperature of from 400 to 700° C., and a drying time of from 5 to 8 hours.

8. The method according to claim 7, wherein the purity of the RE$_2$O$_3$ powder, the Ta$_2$O$_5$ powder and the Nb$_2$O$_5$ powder in operation (1) is not less than 99.9%.

9. The method according to claim 8, wherein in operation (3), the mass percentage of the powder B in the slurry C is 25%, and the mass percentage of the organic binder in the slurry C is 2%.

10. The method according to claim 9, wherein in operation (4), the sintering temperature is 1200° C., and the sintering time is 8 hours.

* * * * *